Jan. 25, 1966    J. J. HEIGL ETAL    3,230,767
MEASUREMENT OF FLUID FLOW RATE
Filed March 19, 1963    2 Sheets-Sheet 1
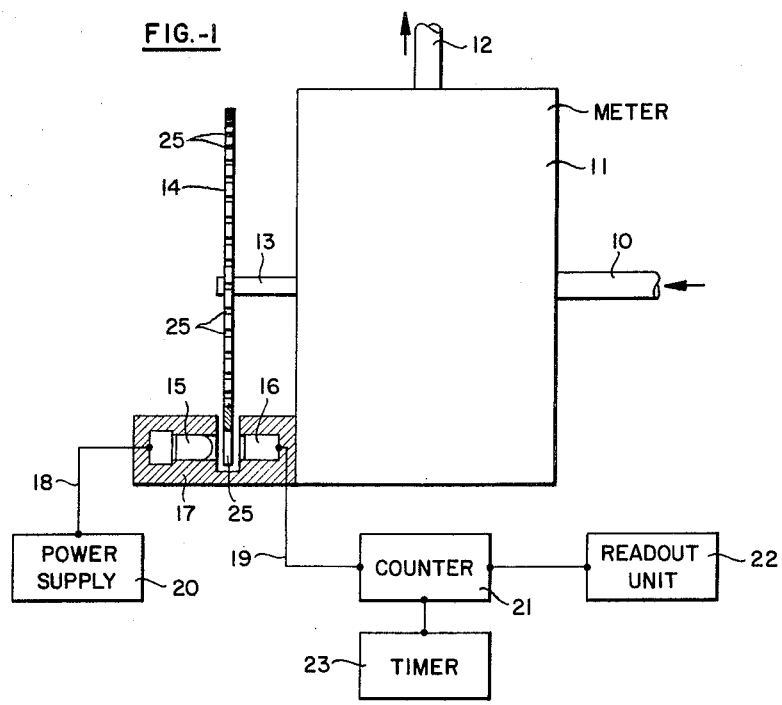
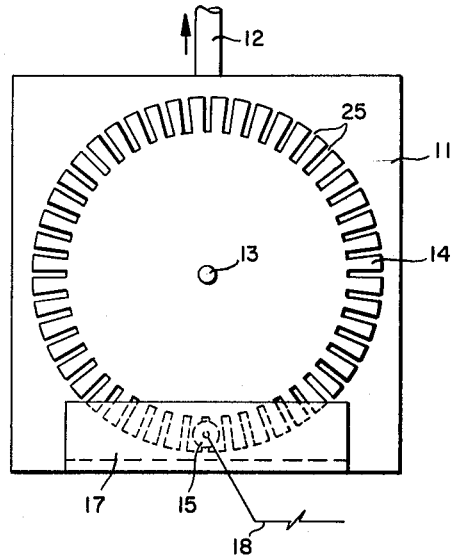
JOHN J. HEIGL
GEORGE E. CONKLIN    Inventors
By W. O. T Heilman
Patent Attorney JOHN J. HEIGL
GEORGE E. CONKLIN    Inventors

United States Patent Office 3,230,767
Patented Jan. 25, 1966

3,230,767
MEASUREMENT OF FLUID FLOW RATE
John J. Heigl, Short Hills, and George E. Conklin, North Plainfield, N.J., assignors to Esso Research and Engineering Company, a corporation of Delaware
Filed Mar. 19, 1963, Ser. No. 266,262
1 Claim. (Cl. 73—198)

The present invention relates to an improved method and apparatus for measuring the flow rate of fluids. In particular the invention concerns a method and apparatus for automatically converting fluid flow into proportional electronic pulsations which are counted over a selectable time interval to yield a direct measure of the fluid rate of flow.

Many types of methods are known in the art to measure the flow rate of fluids. Generally, the great majority of these methods involve the use of quantity meters which are designed to measure the total quantity of fluid discharged during a period of time. In order to obtain the flow rate of the fluid, it is necessary to have an operator check the total quantity of fluid passed through the meter during the desired period. If it is the change in the flow rate that is the desired test quantity, it is necessary that the operator make several checks. Each check would involve reading the intricate dials usually placed on the face of the meter. During this reading, the operator is required to make an approximation in the last few dials which thereby increases the error associated with the measurement. This error becomes especially significant when very low rates of flow are being measured. Furthermore, the operator must subtract the previous total from the most recent one in order to obtain the flow rate for each interval.

It is therefore an object of this invention to provide a method and apparatus for automatically determining and recording the flow rate of fluids thereby eliminating the necessity for an operator to be present during the test period. Another object of this invention is to provide a method and apparatus which can accurately measure both very large and very small flow rates without the introduction of any operator error factor. Still another object is to provide a method and apparatus which will perform the aforementioned measuring functions without the introduction of a substantial error factor due to the measurement function itself.

The fluid to be measured, in the present invention, is led to a quantity meter of a type known to the art. Suitable quantity meters usable in this invention include wet gas meters, dry gas meters, bellows or diaphragm meters, cycloidal meters, rotary disc meters, piston meters or any other type of fluid meter wherein the fluid motion is transferred to a movable element of the meter. The description and method of operation of the above types of quantity meters is fully described in Chemical Engineers' Handbook, third edition, edited by John H. Perry, McGraw-Hill Book Co., New York, 1950, on pages 410–412. A preferred embodiment of the present invention utilizes a wet gas meter.

The quantity meter converts the flow of the fluid to be tested into a proportional motion of a member within said meter. For example, the wet gas meter of a preferred embodiment converts the flow of a gas or liquid into a proportional rotational motion of the central shaft of the meter. This rotation is then used to interrupt a beam of electromagnetic energy, i.e., those wave lengths or radiant energy encompassing gamma rays, X-rays, the infrared, and visible and ultraviolet light. A preferred energy beam encompasses the wave lengths of visible light.

The interruption in the energy beam is easily accomplished by the use of a material which is opaque to the type of energy employed. This material, in a desirable form of the invention, is placed in the path of the beam in the form of a disc which is rotatably attached to the quantity meter shaft. The opaque portions of the disc are symmetrically interrupted by portions transparent to the radiant energy. Therefore as the disc revolves due to the translated fluid flow motion, it will alternately show the energy beam a transparent and then an opaque face. The energy beam emerging from the disc will thus be pulsating at a frequency proportional to the rate of rotation of the disc and therefore will be proportional also to the fluid flow detected by the meter.

In order to sense the pulsating energy beam, any electronic device which will respond to radiant energy can be used. Examples of such devices include photoelectric cells, photovoltaic cells, photoconductive cells, photoelectric tubes, photomuliplier tubes, thermopiles, bolometers and the like. A particularly preferred device is a semiconductor photocell of the "photoswitching" type. These sensing devices will respond directly to the interrupted energy beam by emitting electrical pulse signals. These pulses can then be counted over a selectable time interval and the count displayed as the totalized flow over the time period. In specific embodiments of the invention, it is possible to have this count noted by an operator who then recycles the counting operation or alternatively to have the count total printed automatically on cards or tape followed by a reset of the counter. By properly scaling the alternating opaque-transparent portions of the disc, the count displayed will be a direct measure of the flow rate.

The invention will be further understood by reference to the accompanying drawings which represent a preferred embodiment of the invention.

In the drawings:

FIG. 1 is a partly graphic, partly schematic representation of a preferred embodiment of the fluid flow rate measuring apparatus of the invention.

FIG. 2 is a frontal view of a quantity meter adapted for the present invention.

Figure 3:
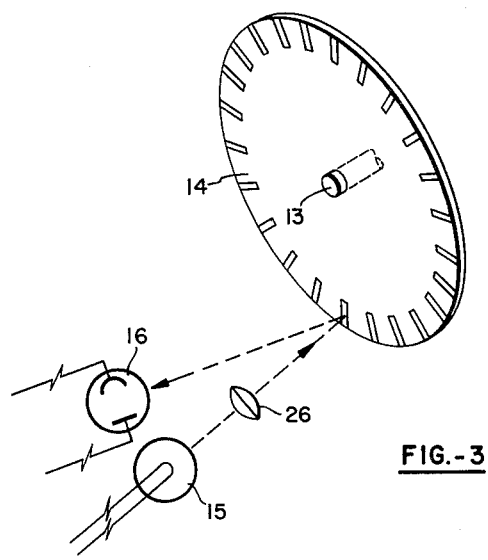
FIG. 3 is a schematic view of a disc adapted to reflect radiant energy.

Reference is now made to the drawings in detail. In FIG. 1, a graphic and schematic representation of the fluid flow rate measuring apparatus is shown. The fluid to be tested, either a gas or liquid, enters quantity meter 11 by means of line 10. Quantity meter 11 is preferably a wet gas meter when gas flow rates are being measured. Suitable adaptations may be made to measure liquid flow, which changes are well known in the art and are described in the Chemical Engineers' Handbook, supra.

The fluid flow is converted into the rotational motion of shaft 13 which projected outside the meter housing. This shaft in turn is centrally attached to disc 14 which will therefore rotate at the same rate as shaft 13. Disc 14 is preferably made of a material which is opaque to the wave lengths of visible light and has a plurality of slots symmetrically placed along its periphery. It is also possible to construct disc 14 out of a material which is transparent to visible light while at the same time substituting radial strips of opaque material symmetrically along the periphery for the slots of the previous specific embodiment.

A source of light 15, e.g. a lightbulb, is positioned in and supported by block 17 in such a manner that the emitted light beam will be projected in toto onto the periphery of disc 14. The light source is powered by power supply 20 by means of electrical conductor 18. It is necessary that this light beam have a diameter which is no longer than the chordial distance between two consecutive transparent sections so as to insure the complete interruption of the light beam. If a very fine light beam is thereby required, a lens system may be introduced between light source 15 and disc 14.

The beam of light emerging on the other side of the disc will be pulsating in direct relationship with the proportion of time the alternating transparent and opaque sections of the disc intercept the light beam. Photoresponsive element 16 is positioned in block 17 so as to receive the resulting pulsating light beam. This photoresponsive element is preferably a photocell of the photoswitching type. An example of a suitable photocell of this type is the Photran 3P15 which is manufactured by Solid State Products, Inc., Salem, Massachusetts.

The photoswitching cell 17 will yield a single, shaped pulse output for each individual light impulse striking it. This results not only from the properties of the photoswitching cell itself but also from the action of the circuit in which it is placed. A more detailed discussion of such a circuit will be given later in this description.

The output electrical pulses from photoswitching cell 17 activate counter 21 by means of connecting conductor 19. This counter may be any electromagnetic impulse counter of which there are many types commercially available. It may be reset electrically or by push button. In the former case, an external timer 23 will provide the control signal which will activate the reset mechanism. This timer can be set to yield a control signal at the end of any period desired by the operator. Such timers are well known in the art and are commercially available. If a counter having a manual reset is used, the operator must observe the time period for himself and will be required to read off the total count. Automatic readout can be provided by either using a printing counter to record the total directly on paper or else by using a separate readout unit 22 which can take the form of a punch card, tape or other similar data storage instrumentality. It is also possible to have this readout unit at a place remote from the metering point which allows the system to be used advantageously in industrial plants and laboratories.

Turning to FIG. 2, a frontal view of a quantity meter adapted for the purposes of the present invention is shown. The specific embodiment described in this figure utilizes a number of slots 25 in the periphery of disc 14 to allow the passage of light supplied by light source 15. For most applications, the total number of these slots will be in the range of 10 to 200, e.g., 100, symmetrically disposed around the disc's circumference. However, this amount can vary greatly depending on the type of flow being measured. If a very high flow rate is tested, then a smaller number of slots would be desirable in order not to exceed the ability of the photocell to respond to each individual light impulse. On the other hand, if a very small flow rate is tested, then a greater number of slots is desired in order to increase the sensitivity of the count and to thereby detect small rate changes without a large error factor.

Standardization of this apparatus is extremely simple. The meter 11 is designed to pass a known volume of fluid per full rotation of shaft 13. The volume being measured per count can then be obtained by dividing the volume per revolution by the number of slots on disc 14. Therefore the total number of counts delivered per time period is a direct representation of the rate of fluid flow through meter 11.

Elements common to FIG. 1 include fluid outlet 12, support block 17, and electrical conductor 18.

Turning now to FIG. 3, a schematic view of another embodiment of the light interrupting system is shown. In this specific embodiment, light supplied by light source 15 falls alternatively on reflective and non-reflective zones which are symmetrically disposed around the disc's circumference. Photocell 16 is located on the same side of the disc as light source 15 in this embodiment. The photocell is located at an angle from the light source, which angle will be equivalent to twice the angle of incidence for the particular system employed. In this embodiment, it is not necessary that the entire light beam fall on the disc, but it is necessary that the light beam does not overlap more than one zone. This can be accomplished by passing the light from the light source through lens system 26 before it reaches the disc.

Figure 4:
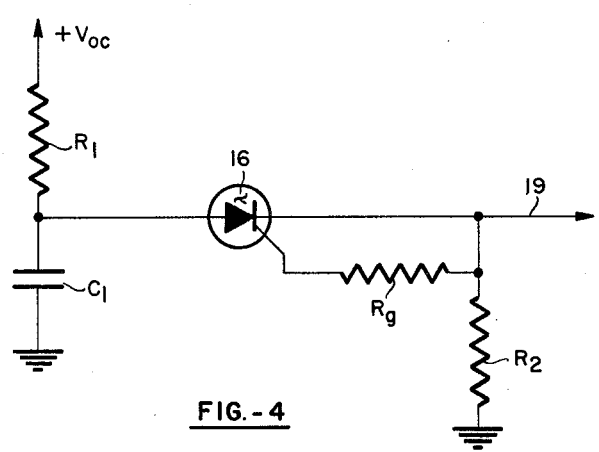
FIG. 4 is a schematic representation of the energy sensing and pulse emitting circuit in a preferred embodiment of the invention.

Turning now to FIG. 4, a schematic diagram of a preferred embodiment of the energy sensing and pulse emitting circuit is shown. Photosensitive switch 16, in a preferred embodiment, is a bistable switch. Before light strikes the photosensitive switch, it is in a high impedance "off" state, e.g., over 10 megohms. When a light impulse is applied to the photocell, it is switched to a low impedance "on" state, e.g., under 10 ohms. The light energy used to trigger the device need only be momentary since it is not required to sustain the device in the "on" state. This time period for response is typically 10 microseconds but it can be reduced to below 1 microsecond if the intensity of the light beam is increased sufficiently.

When light is not present on photocell 16, it will be in the "off" state and will not conduct current. Therefore capacitor $C_1$ will be charged to the energy level of the supply voltage $V_{oc}$ through resistor $R_1$. When a light impulse occurs, photosensitive switch 16 switches to the "on" state and conducts current. Thus, at this instant capacitor $C_1$ is discharged through the photosensitive switch 16 and resistor $R_2$. The result is a single sharp pulse output each time the light beam is removed and then subsequently reapplied to the photocell. This pulse is then transferred to the counter by means of electrical conductor 19 without the need of further amplification or shaping.

The amplitude and width of the output pulse are set by the circuit values and are independent of the light intensity applied to the photosensitive switch. It is possible to set the threshold level of the photoswitch's response at any level of light intensity by changing the gate bias current. This is accomplished by adjusting the value of resistor $R_g$ in the circuit. In this way, the threshold level may be set well above any ambient illumination which could otherwise be a source of error.

The advantages obtained by use of the fluid flow rate measuring apparatus of this invention are summarized below:

(1) the apparatus can be constructed by very simple modifications of existing equipment;

(2) the apparatus can eliminate the need for an operator thereby resulting in manpower savings;

(3) reading errors are eliminated;

(4) high accuracy is obtained for both high and low fluid flow rates;

(5) the circuit produces a single signal per impulse and eliminates the need for additional signal shaping or amplification circuits;

(6) the absence of physical connections between the quantity meter and the counter eliminates any errors due to possible resistance to the movement of the meter elements; and (7) remote readout is possible.

What is claimed is:

In apparatus of the character described, the combination which comprises (A) a quantity meter including a rectangular housing adapted to receive a fluid inlet line on one side thereof, said quantity meter being provided with a shaft responsively rotatable with the flow of fluid, said shaft also projecting outside said housing from the side thereof opposite said inlet line, (B) a circular member mounted on said shaft and outside said housing, said circular member having alternate peripheral zones, the first of said zones being transparent to radiant energy and the second of said zones being opaque to radiant energy; said transparent zones comprising a plurality of uniformly spaced and similarly shaped rectangular notches intersecting the periphery of said circular member, (C) a source of radiant energy affixed in relation to said circular member so as to produce an energy beam which will fall entirely within the periphery of said circular member;

(D) radiant energy responsive means for converting said radiant energy into electrical impulses, said energy responsive means including a source of voltage supply, a capacitor connected to said voltage supply for storage of energy received therefrom, a photosensitive switch being positioned adjacent the periphery of said circular member on the side opposite said radiant energy source and arranged to receive radiant energy from said source during passage therebetween of said transparent zones, said switch being electrically connected to said capacitor and assuming a conductive state to discharge said capacitor when illuminated by radiant energy and being nonconductive when out of view from said radiant energy source to permit the voltage supply source to recharge said capacitor whereby a sharp single and shaped electrical pulse is produced each time the photosensitive switch becomes conductive irrespective of the absolute magnitude and intensity of the amount of radiant energy from said source striking said photosensitive switch.

References Cited by the Examiner

UNITED STATES PATENTS

| | | | |
|---|---|---|---|
| 1,957,681 | 5/1934 | Thompson | 73—231 |
| 2,204,463 | 6/1940 | Allen | 73—231 |
| 2,623,389 | 12/1952 | Van Oosterom | 73—231 |
| 2,723,562 | 11/1955 | Lutz et al. | 73—231 |
| 2,882,034 | 4/1959 | Wuerth | 73—490 |
| 2,962,895 | 12/1960 | Rumble | 73—231 X |
| 3,035,449 | 5/1962 | Hollmann | 73—490 |
| 3,076,334 | 2/1963 | Wiley | 73—231 X |
| 3,130,582 | 4/1964 | Phillips et al. | 73—229 X |
| 3,156,115 | 11/1964 | Adelmann | 73—272 X |

RICHARD C. QUEISSER, *Primary Examiner.*